April 30, 1935.  J. W. WHITE  1,999,675
HYDRAULIC BRAKE
Filed Jan. 8, 1934
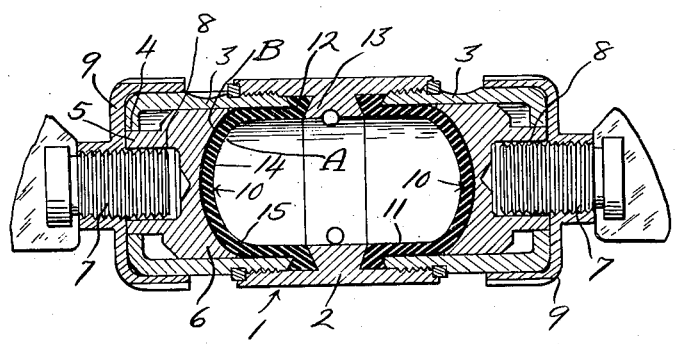
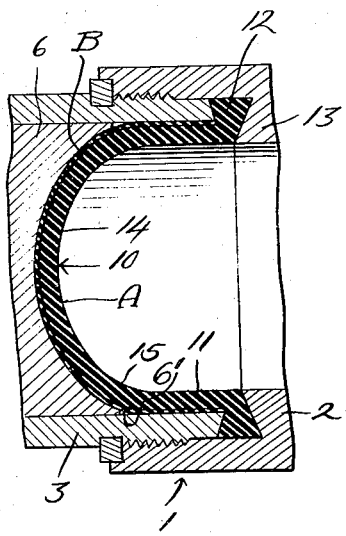
INVENTOR
John William White
BY
ATTORNEYS Patented Apr. 30, 1935

1,999,675

UNITED STATES PATENT OFFICE 1,999,675

HYDRAULIC BRAKE

John William White, Detroit, Mich.

Application January 8, 1934, Serial No. 705,770

7 Claims. (Cl. 60—54.6)

The invention relates to hydraulic actuators for brakes with the actuators of that type in which the chambers for receiving the actuating fluid have walls comprising flexible diaphragms.

One of the objects of the invention is to provide a hydraulic actuator having an improved diaphragm constructed to operate without permanent deformation when subjected to pressure and heat during the operation and also constructed to have good wear resisting properties. Another object is to form the diaphragm with a relatively soft main portion to avoid permanent deformation and with a relatively hard skin portion to reduce the friction and to produce good wear resisting properties.

These and other objects of the invention will become apparent from the following description, taken in connection with the accompanying drawing, in which Figure 1 is a longitudinal section through a hydraulic actuator showing an embodiment of my invention;

Figure 2 is an enlarged view of a portion thereof.

The hydraulic actuator, as shown, has the housing 1 which comprises the central housing member 2 and the end housing members 3. The end housing members are threaded into the opposite ends of the central housing member in axial alignment with each other and are cup-shaped with the bottoms of the cups at their outer ends. These bottoms are centrally apertured at 4 to receive and guide the reduced end portions 5 of the pistons 6 having enlarged portions slidably engaging the cylindrical side walls of the end housing members. 7 are screws extending freely into the axial recesses 8 in the reduced end portions 5 and 9 are nuts threaded upon the screws and adapted to abut the outer ends of the reduced end portions 5 of the pistons. The outer ends of the screws are operatively connected to the ends of the brake shoe and upon outward movement of the pistons the screws through the nuts are adapted to spread apart the ends of the brake shoe.

10 are flexible rubber diaphragms within the housing 1 and adapted to form with the central housing member a chamber for receiving the brake actuating fluid. Each of these diaphragms is cup-shaped and the cups are opposed to each other with their interiors opening toward the center of the housing 1. Each cup has at the inner end of its side wall 11 the outwardly extending annular bead 12 which is wedge-shaped in cross section and which is engaged by correspondingly inclined faces formed upon the inner end of the adjacent end housing member 3 and the annular inwardly extending wedge-shaped portion 13 of the central housing member. The central portion 14 of the dome of each cup has normally a radius greater than that of the cylindrical side wall 11 and the corner portion 15 of the dome has normally a radius smaller than that of the central portion, so that the dome is relatively low and inherently well supported. The inner end of the piston 6 is concave in form to substantially correspond to the form of the outer face of the dome of the cooperating diaphragm and the lip or corner 6' of the piston is preferably rounded away from the diaphragm. The arrangement is such that the domes of the diaphragms will exactly conform to the pistons and the side walls of the diaphragms will exactly conform to the side walls of the end housing members 3 when the pistons are either in their normal or contracted positions or fully extended positions without subjecting the diaphragms to objectionable localized stresses or cutting at any points. The corner portions 15 may be of greater thickness than the central portion 14 and the cylindrical side walls 11 to thereby decrease the flexibility of these corner portions.

For the purpose of preventing permanent deformation or cold flow of the rubber forming each diaphragm during the operation of the brake by reason of heat and also high pressure of the brake actuating fluid and also for the purpose of making the rubber with good wear resisting properties, the main portion A of each diaphragm throughout its extent is made of relatively soft rubber of a hardness of between 60 and 80, as measured on a durometer, and the outer surface B of each diaphragm which forms the friction surface engageable with the end housing member and the piston is formed of a rubber having greater hardness of between 90 and 100, as measured on a durometer. This harder outer surface or skin has low friction properties and consequently opposes but little friction drag to the movement of each diaphragm relative to the end housing member and the piston during operation, so that scuffing of the diaphragm is greatly reduced.

In forming each diaphragm, it is made of rubber cured normally to a durometer hardness of 60 to 80 and it is then dipped into a suitable agent formed of sulphur chloride and carbon tetrachloride with its exterior in contact with this agent. This agent hardens the exterior surface and the hardness can be controlled by varying the time during which the diaphragm remains dipped and also by varying the strength of the solution forming the agent. After the dipping, the diaphragm is suitably washed in ammonia and water, after which it is ready for use.

From the above description, it will be readily seen that I have provided an actuator having a peripherally clamped diaphragm which forms the sealing means extending across the housing of the actuator and that this diaphragm is so formed that it has a skin of relatively hard low friction rubber on its external or friction surface and that it has an integral main portion of relatively soft rubber which will not permanently deform or cold flow when subjected to heat and high pressure during the operation. At the same time the diaphragm is resilient to effect the necessary movement of the piston engaged thereby.

What I claim as my invention is:

1. In an actuator, the combination with a housing and a piston movable relative thereto, of a rubber diaphragm extending across said housing for actuating said piston, the rubber forming the friction surface of said diaphragm being relatively hard and the rubber forming the remaining portion of said diaphragm being softer.

2. In an actuator, the combination with a housing and a piston movable relative thereto, of a rubber diaphragm extending across said housing for actuating said piston, the rubber forming the friction surface of said diaphragm having low friction properties and the rubber forming the remaining portion of said diaphragm being more resilient.

3. In an actuator, the combination with a housing and a piston movable in the housing, of means for actuating the piston including a flexible diaphragm having the outer surface adjacent the piston of lower friction properties than the inner surface.

4. In an actuator, the combination with a housing and a piston movable within the housing, of means within said housing for actuating the piston including a flexible diaphragm having a relatively hard low friction surface portion engageable with the piston and having other portions substantially more resilient than said surface portion.

5. In an actuator, the combination with a housing and a piston movable within the housing, of means for actuating the piston including a flexible diaphragm having a portion engageable with the piston and side walls of the housing adjacent the piston provided with a surface of lower skin friction than the remaining portion of the diaphragm.

6. In an actuator, the combination with a housing and a piston movable within the housing, of means for actuating the piston including a flexible diaphragm having a relatively soft resilient cup-shaped main portion and having a relatively hard low friction skin portion engageable with the piston.

7. In an actuator, the combination with a housing and a piston movable within the housing, of a rubber diaphragm having a relatively soft resilient cup-shaped main portion located in the housing with the outer surface thereof engaging the piston and adjacent side walls of the housing, the rubber forming the outer surface aforesaid being harder than the cup-shaped main portion providing a surface of low skin friction.

JOHN WILLIAM WHITE.